(12) United States Patent
Bähr et al.

(10) Patent No.: US 9,061,301 B2
(45) Date of Patent: Jun. 23, 2015

(54) KNAPSACK SPRAYING DEVICE (71) Applicant: Andreas Stihl AG & Co. KG, Waiblingen (DE)

(72) Inventors: Christine Bähr, Ebersbach/Fils (DE); Harald Schliemann, Waiblingen (DE)

(73) Assignee: ANDREAS STIHL AG & CO. KG, Waiblingen (DE)

( * ) Notice: Subject to any disclaimer, the term of this patent is extended or adjusted under 35 U.S.C. 154(b) by 65 days.

(21) Appl. No.: 13/922,315

(22) Filed: Jun. 20, 2013

(65) Prior Publication Data
US 2014/0209705 A1 Jul. 31, 2014

(30) Foreign Application Priority Data
Jan. 31, 2013 (DE) .......................... 10 2013 001 779

(51) Int. Cl.
B05B 7/26 (2006.01)
B05B 7/24 (2006.01)
(Continued)

(52) U.S. Cl.
CPC ............ B05B 7/2475 (2013.01); A01M 7/0021 (2013.01); B05B 7/1418 (2013.01); B05B 7/1427 (2013.01); B05B 12/1418 (2013.01); B05B 7/0416 (2013.01)

(58) Field of Classification Search
CPC .. B05B 7/1418; B05B 7/1427; B05B 7/2402; B05B 7/2416; B05B 7/2475; A01M 7/0017; A01M 7/0021; A01M 9/0038; A01M 9/0046
USPC ......... 239/124, 126, 127, 152–154, 289, 302, 239/329, 331, 332, 398, 407, 408, 417.5, 239/433, 434, 525, 526; 15/327.5, 405
See application file for complete search history.

(56) References Cited

U.S. PATENT DOCUMENTS 1,986,407 A * 1/1935 Parker .............................. 239/77
3,421,697 A * 1/1969 Marks ........................... 239/152
(Continued)

FOREIGN PATENT DOCUMENTS

DE 10 2007 023 409 A1 11/2008
EP 1 782 889 A2 5/2007
FR 1 101 149 A 9/1995

OTHER PUBLICATIONS

European Search Report, Appl. No. 13002887.1, May 20, 2014, 6 pgs.
(Continued)

*Primary Examiner* — Darren W Gorman
(74) *Attorney, Agent, or Firm* — Paul D. Strain, Esq.; Strain & Strain PLLC (57) ABSTRACT

The application sets forth a knapsack or backpack spraying device having a blower unit and a spraying medium container fixed to a carrying frame. The blower unit conveys an air stream through a blower pipe. Spraying medium is fed from the spraying medium container to the air stream. The spraying medium container has a filling opening which is closed by a cover. The cover has a lower edge facing the spraying medium container. The spraying device has a standing position in which it stands on a flat, horizontal standing face and in which the cover is arranged on an upper side of the spraying medium container facing away from the standing face. To reliably avoid contact of the operator with spraying medium, the height of the carrying frame, measured at right angles to the standing face, is at least 80% of the overall height of the spraying device.

20 Claims, 6 Drawing Sheets (51) Int. Cl.
*B05B 7/00* (2006.01)
*A01M 7/00* (2006.01)
*B05B 7/14* (2006.01)
*B05B 12/14* (2006.01)
*B05B 7/04* (2006.01)

(56) References Cited

U.S. PATENT DOCUMENTS

| | | | |
|---|---|---|---|
| 3,586,238 A | * | 6/1971 | Schmierer et al. ............ 239/153 |
| 7,673,813 B2 | | 3/2010 | Raffenberg et al. |
| D623,722 S | * | 9/2010 | Tinius .......................... D23/225 |
| D654,567 S | * | 2/2012 | Yamamoto et al. .......... D23/225 |
| 2008/0172826 A1 | | 7/2008 | Rappin |

OTHER PUBLICATIONS

Curtis Dyna-Fog Ltd., "Twister XL3 Motorized Knapsack ULV Sprayer", Dynafog.com, XP002723686, Aug. 27, 2012, found online on Apr. 25, 2014 at URL: http://web.archive.org/web/20120827013711/http://dynafog.com/international/ulv/piston_enginge/twister_xl/index htm.

* cited by examiner

KNAPSACK SPRAYING DEVICE

CROSS-REFERENCE TO RELATED PATENT APPLICATIONS

This application is based upon and claims the benefit of priority from prior German Patent Application No. DE 10 2013 001 779.3, filed Jan. 31, 2013, the entire contents of which are incorporated herein by reference in their entirety.

BACKGROUND

The application relates to a knapsack or backpack spraying device comprising a carrying frame a blower unit, a spraying medium container for containing a spraying medium, wherein the blower unit and spraying medium container are fixed to the carrying frame, wherein the blower unit conveys an air stream through a blower pipe connected to the blower unit, wherein the spraying medium container further comprises a filling opening which is closed by a cover, wherein the spraying medium is conveyed from the spraying medium container through a spraying medium line to the air stream, wherein the cover comprises a lower edge facing the spraying medium container, wherein the backpack spraying device comprises a standing position in which the spraying device stands on a flat, horizontal standing face, wherein the cover is arranged on an upper side of the spraying medium container facing away from the standing face, and wherein the height of the carry frame, measured at right angles to the standing face, is at least about 80% of the overall height of the spraying device, measured at right angles to the standing face.

DE 10 2007 023 409 A1 discloses a knapsack spraying device having a carrying frame. The carrying frame ends below the central height of the spraying medium container. The spraying medium container has a depression for the carrying frame, so that the spraying medium container and the carrying frame end approximately flush with each other on the side facing the operator and form an approximately flat surface.

SUMMARY OF PREFERRED EMBODIMENTS

One object of the application is devising a knapsack or backpack spraying device of the generic type which exhibits increased operating and carrying comfort.

This particular object is achieved by a knapsack or backpack spraying device comprising a carrying frame a blower unit, a spraying medium container for containing a spraying medium, wherein the blower unit and spraying medium container are fixed to the carrying frame, wherein the blower unit conveys an air stream through a blower pipe connected to the blower unit, wherein the spraying medium container further comprises a filling opening which is closed by a cover, wherein the spraying medium is conveyed from the spraying medium container through a spraying medium line to the air stream, wherein the cover comprises a lower edge facing the spraying medium container, wherein the backpack spraying device comprises a standing position in which the spraying device stands on a flat, horizontal standing face, wherein the cover is arranged on an upper side of the spraying medium container facing away from the standing face, and wherein the height of the carry frame, measured at right angles to the standing face, is at least about 80% of the overall height of the spraying device, measured at right angles to the standing face.

It has been shown that, when putting in spraying medium, despite the known, very large filling opening, spraying medium can be spilled. This spraying medium can run along on the spraying medium container and reach the side of the carrying frame facing the operator. The spraying medium can also reach a back cushion arranged on the carrying frame. Contact of the spraying medium with the back cushion or shoulder straps of the carrying frame and contact of the operator with spraying medium is undesired.

In an embodiment of the application, in order to avoid contact of the operator with spraying medium on the carrying frame, provision is now made for the height of the carrying frame, measured at right angles to the standing face, to be at least about 80% of the overall height of the spraying device, measured at right angles to the standing face. The carrying frame accordingly extends, at least in one region, over a large part of the overall height of the spraying device. When the operator carries the carrying frame on his back, contact of the operator with spilled spraying medium can largely be avoided as a result. The fact that the carrying frame extends over a large part of the overall height of the spraying device means that it is largely possible to avoid spilled spraying medium being able to reach the side of the carrying frame facing the operator. In addition, contact of the operator with the spraying medium container on which spilled spraying medium can run down can largely be avoided by the comparatively large height of the carrying frame. When putting in spraying medium, the operator does not need to take excessive care, since spilled spraying medium cannot reach a back cushion or shoulder strap of the carrying frame, so that the result is convenient operation.

In another embodiment, the height of the carrying frame, measured at right angles to the standing face, advantageously may amount to at least about 90% of the overall height of the spraying device, measured at right angles to the standing face. As a result, the carrying frame largely covers the spraying medium container in the direction of the operator. In a further embodiment, the filling opening of the spraying medium container is advantageously formed on a filling nozzle. The filling nozzle advantageously merges at one edge into the upper side of the spraying medium container. The edge can, for example, run annularly around the filling nozzle. The distance of the edge to the standing face, measured at right angles to the standing face and adjacent to the carrying frame, is advantageously smaller than the height of the carrying frame. As a result, the carrying frame projects beyond the edge in the standing position. On the upper side, the spraying medium container usually widens with respect to the filling nozzle and also projects in the direction of the operator. This region projecting toward the operator is shielded from the operator by the carrying frame, which projects beyond the edge in the standing position. As a result, contact of the operator with this region of the spraying medium container can largely be avoided during operation, i.e. when the operator carries the carrying frame on his back.

In still another embodiment, advantageously, in the standing position, at least one region of the carrying frame is located higher than at least one region of the lower edge of the cover of the spraying medium container. The carrying frame projects at least as far as the height of the lower edge of the cover. The carrying frame does not have to project as far as the height of the lower edge of the cover over its entire width. Even if one region of the carrying frame is located higher than one region of the lower edge of the cover, contact of the operator with spraying medium can largely be avoided. In the case of an unevenly formed or obliquely arranged cover, in order to largely avoid contact of the operator with spraying medium it is sufficient if a region of the lower edge of the cover is located lower than a region of the carrying frame. The terms "higher" and "lower" in this case refer to the vertical direction, that is to say the operative direction of the force of gravity in the standing position.

In yet another embodiment, the fact that at least one region of the carrying frame is located higher than at least one region of the cover means that the region of the carrying frame is arranged between the spraying medium container and the operator and protects the operator against contact with the spraying medium container. The fact that the carrying frame projects higher than the lower edge of the cover of the spraying medium container means that spraying medium which has been spilled at the filling opening of the spraying medium container cannot run down on the side of the carrying frame facing the operator. As a result, contact of the operator with spraying medium on the carrying frame during operation is reliably avoided.

In still a further embodiment, the fact that, in the standing position, at least one region of the carrying frame is located higher than at least one region of the lower edge of the cover means that, in the standing position, this region is at a greater distance from the standing face than the region of the lower edge of the cover. The side of the cover facing the spraying medium container can also be formed irregularly, for example in a corrugated manner. The lower edge of the cover is then made up of the regions respectively located closest to the spraying medium container, and is therefore not a continuous line.

In still yet a further embodiment, advantageously, in the standing position, the region of the carrying frame is higher than the region of the lower edge of the cover that faces the carrying frame. The lower edge of the cover is advantageously located in a first imaginary plane, this plane intersecting the carrying frame adjacent to the at least one region of the carrying frame. The carrying frame extends as far as the height of the lower edge of the cover and, as seen in the vertical direction, projects beyond the lower edge of the cover in the at least one region of the carrying frame. In yet still another embodiment, the region of the carrying frame which, in the standing position, is located higher than the at least one region of the lower edge of the cover advantageously has a width which amounts to at least about 80% of the external diameter of the filling nozzle. The external diameter of the filling nozzle is measured in the imaginary plane in which the lower edge of the cover is located. The width of the region of the carrying frame is measured in a plane parallel to the standing face of the spraying device, in particular in the imaginary plane in which the lower edge of the cover is located. The region of the carrying frame is advantageously arranged such that, during operation, it is located between the filling nozzle and the operator. The width of the region of the carrying frame is in particular at least as large as the external diameter of the filling nozzle, particularly advantageously at least about 1.2 times as large.

In yet another embodiment, in the standing position, the lower edge of the cover is advantageously located approximately horizontally. The first imaginary plane advantageously encloses with the standing face an angle of less than about 10°, in particular of less than about 5°, particularly advantageously of about 2°. In the case of conventional cover configurations, the result is an approximately vertically aligned filling nozzle of the spraying medium container and an approximately horizontally aligned upper edge of the filling nozzle. As a result, easy filling with spraying medium is ensured. Advantageously, the angle is present when the spraying medium container is empty. On account of the weight of the spraying medium, a part connecting the spraying medium container to the carrying frame, for example a carrier part, is able to deform elastically. The angle is advantageously chosen such that the lower edge of the cover runs parallel to the standing face, that is to say horizontally, in the standing position with the spraying medium tank filled completely.

In still a further embodiment, advantageously, the distance of the filling nozzle from the carrying frame, measured parallel to the standing face, is less than half the external diameter of the filling nozzle. The distance of the filling nozzle to the carrying frame is advantageously less than about 40%, in particular less than about 30%, of the external diameter of the filling nozzle. The distance of the filling nozzle from the carrying frame is advantageously less than about 8 cm, in particular less than about 6 cm. A distance of about 3 cm to about 6 cm has proven to be particularly advantageous. The spraying medium container is advantageously arranged close to the carrying frame. In particular, the spraying medium container touches the carrying frame. The result is a beneficial weight distribution. The closer the center of gravity of the spraying medium container is located to the user, that is to say also to the back plate of the carrying frame, the smaller the bending moment generated on the carrying frame by the spraying medium container, which bending moment has to be absorbed by the user. As a result of a low or short distance between spraying medium container and carrying frame, the strain on the operator can be reduced. The spraying medium container is in particular arranged above the blower unit in the standing position.

In yet another embodiment, advantageously, the carrying frame largely covers the spraying medium container in the horizontal direction when in the standing position. The maximum width of the carrying frame is advantageously at least about 85% of the width of the spraying medium container. Both the width of the carrying frame and the width of the spraying medium container are measured parallel to the standing face. In the region of the spraying medium container, the carrying frame is formed approximately as a flat plate, where the plate is a molded surface and can have stiffening struts or different thicknesses. The width of the carrying frame is advantageously measured parallel to the standing face and approximately parallel to the surface of the back plate of the carrying frame. The width of the spraying medium container is measured parallel to the width of the carrying frame. The width of the carrying frame advantageously extends parallel to the transverse direction of the operator, i.e. parallel to the lateral direction. The width of the carrying frame in each plane running parallel to the standing face is advantageously at least 80% of the width of the spraying medium container in this plane. In each sectional plane of the carrying frame parallel to the standing face, it is possible to draw an extremely small rectangle enclosing the carrying frame, the long side of the rectangle corresponding to the width of the carrying frame and the short side of the rectangle corresponding to the depth of the carrying frame.

In another further embodiment, in the region of the spraying medium container adjacent to the carrying frame, the spraying medium container runs approximately level and is aligned so as to fall steeply, in particular approximately vertically, in the standing position. The height of the steeply falling region of the spraying medium container adjacent to the carrying frame is preferably completely covered by the carrying frame. The distance of the upper section of the steeply falling region of the spraying medium container from the standing face is advantageously smaller than the height of the back plate in this region. In the standing position, the carrying frame projects in the vertical direction beyond the steeply falling region of the spraying medium container. In still yet another embodiment, advantageously, the carrying frame comprises a back plate and a base plate. At its upper edge, located facing away from the base plate, the carrying frame is advantageously bent over toward the spraying medium container. As a result, a rounded transition to the back plate is created, and contact of the operator with a sharp edge of the carrying frame is avoided. The bent-over upper edge additionally increases the stability of the carrying frame. The back plate is advantageously bent over toward the spraying medium container at its edge in the whole of the region arranged on the spraying medium container. The bent-over edge also prevents the situation where, for example, when the spraying device is lying down, spilled spraying medium can reach the edge of the back plate and from there, for example when the spraying device is stood up again, can reach the side of the back plate facing the operator and the shoulder strap or a shoulder cushion of the carrying frame. The edge also intercepts spilled spraying medium laterally. In still yet another further embodiment, in order to achieve deliberate drainage of the collected spraying medium to the ground, provision is made for the base plate to have at least one drainage opening. The distance of the drainage opening from the side of the back plate that faces an operator, measured parallel to the standing face, is advantageously at least about 3 cm. As a result, spraying medium is prevented from being able to drip onto the feet and legs of the operator. A distance of from about 4.5 cm up to about 6 cm has proven to be particularly advantageous.

In yet a further embodiment, a simple and stable design construction results if the spraying medium container is held on the carrying frame via a carrier part. The carrier part advantageously has at least one drainage opening for spraying medium. The carrier part is able to intercept spraying medium which runs downward on the spraying medium container and to lead said medium to the drainage opening of the base plate via the at least one drainage opening of the carrier part. The drainage opening is advantageously arranged in the region facing the back plate of the carrying frame. Advantageously, the distance of the drainage opening from the back plate is less than about half the depth of the carrier part. The depth of the carrier part is measured approximately at right angles to the back plate.

In a further embodiment, advantageously, the blower unit has a drive motor and an impeller driven by the drive motor, which are arranged in a housing. The drive motor can be, for example, an internal combustion engine or an electric motor. The electric motor can be supplied with energy via a power cable or from a battery or an accumulator. An interspace is advantageously formed between the blower unit and the back plate. Via the interspace, spraying medium can be led downward to the base plate when in the standing position and during operation. Advantageously, in the standing position, at least one drainage opening is arranged above a housing wall of the housing, which falls toward the interspace. This ensures that spraying medium dripping onto the housing cannot pass in the direction to the drive motor, but is led away into the interspace. As a result, wetting of the drive motor with spraying medium and, as a result, corrosion of the drive motor, is avoided. In addition, contact with operating elements of the drive motor, such as a starting handle, or operating elements for choke or purger is avoided. Advantageously, in the standing position, at least one drainage opening is arranged above the interspace. Via this drainage opening, spraying medium can get directly into the interspace and from there to the base plate and be led away via the drainage opening in the base plate.

In still yet another embodiment, advantageously, at least one drainage opening is formed between the carrier part and the back plate. In particular, a plurality of drainage openings are provided in different regions of the spraying medium container, so that, irrespective of the point of the spraying medium container at which the operator spills spraying medium, spraying medium can be led reliably away to the carrier part and to the base plate.

Further objects, features, and advantages of the present application will become apparent form the detailed description of preferred embodiments which is set forth below, when considered together with the figures of drawing.

BRIEF DESCRIPTION OF THE DRAWINGS

An exemplary embodiment of the application will be explained below by using the drawing, in which.

DETAILED DESCRIPTION OF PREFERRED EMBODIMENTS

Figure 1:
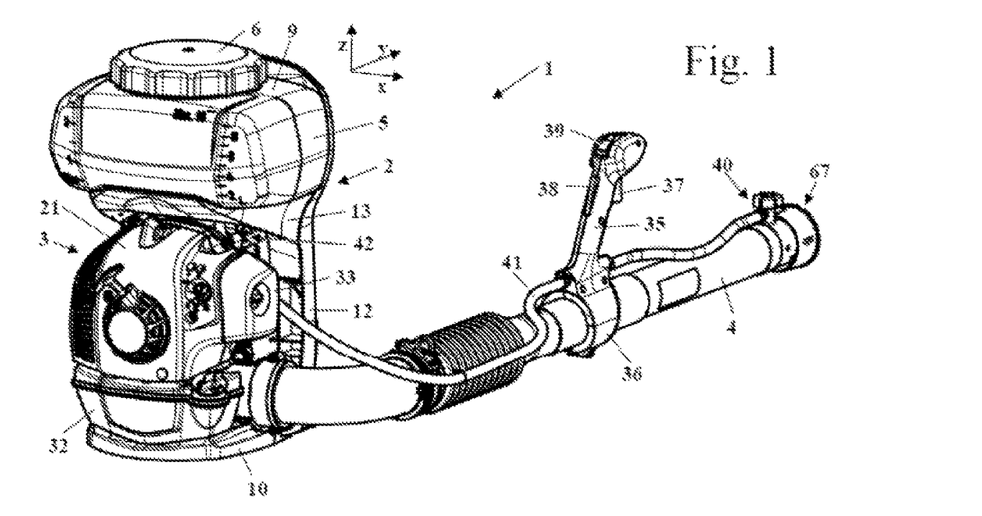
FIG. 1 shows a perspective illustration of a spraying device.

FIG. 1 shows a backpack spraying device 1. The spraying device 1 has a carrying frame 2, on which a blower unit 3 and a spraying medium container 5 are fixed. The blower unit 3 delivers an air stream through a blower pipe 4, which has an outlet opening 67 for the air stream. The spraying device 1 has a spraying medium line 41 and a metering valve 40, via which spraying medium is supplied to the air stream delivered by the blower pipe 4, adjacent to the outlet opening 67. The blower unit 3 comprises a drive motor, not shown in FIG. 1, arranged in a housing 21, which motor in the exemplary embodiment is formed as an internal combustion engine. The drive motor can also be an electric motor. The spraying device 1 has a fuel tank 32, from which fuel is supplied to the drive motor. The housing 21 comprises an air filter cover 33, which can be removed in order to clean an air filter arranged adjacent to the air filter cover 33 in the housing 21.

The carrying frame 2 comprises a back plate 12 which, during operation, is arranged adjacent to the back of an operator. In addition, the carrying frame 2 has a base plate 10, which is oriented approximately at right angles to the back plate 12 and on which the fuel tank 32 can be fixed. By using the base plate 10, the spraying device 1 can be stood on the ground. For this purpose, the base plate 10 can have standing feet. The spraying medium container 5 rests on a carrier part 13 fixed to the back plate 12. The carrier part 13 can be, for example, an injection molded part made of plastic. On its upper side 9 facing away from the blower unit 3, the spraying medium container 5 has a filling opening closed by a cover 6.

In order to operate the drive motor and to guide the blower pipe 4, a handle 35 is provided, which is fixed to the blower pipe 4 via a collar 36. The spraying medium line 41 is also guided on the collar 36. Arranged on the handle 35 are a gas lever 37, a gas lever lock 38, a stop switch 39 and an operating lever 43 shown in FIG. 2. The operating lever 43 is advantageously used to lock the position of the gas lever 37.

As FIG. 1 shows, the spraying device 1 extends in the spatial directions x, y and z. The spatial directions x, y and z are oriented at right angles to one another. The base plate 10 extends substantially in the spatial directions x and y. The back plate 12 of the carrying frame 2 has its greatest extents in the spatial directions x and z. The upper side 9 of the spraying medium container 5 is the side located at the top in the spatial direction z, also shown in FIG. 4. In the spatial direction z, the spraying medium container 5 is arranged above the blower unit 3.

Figure 2:
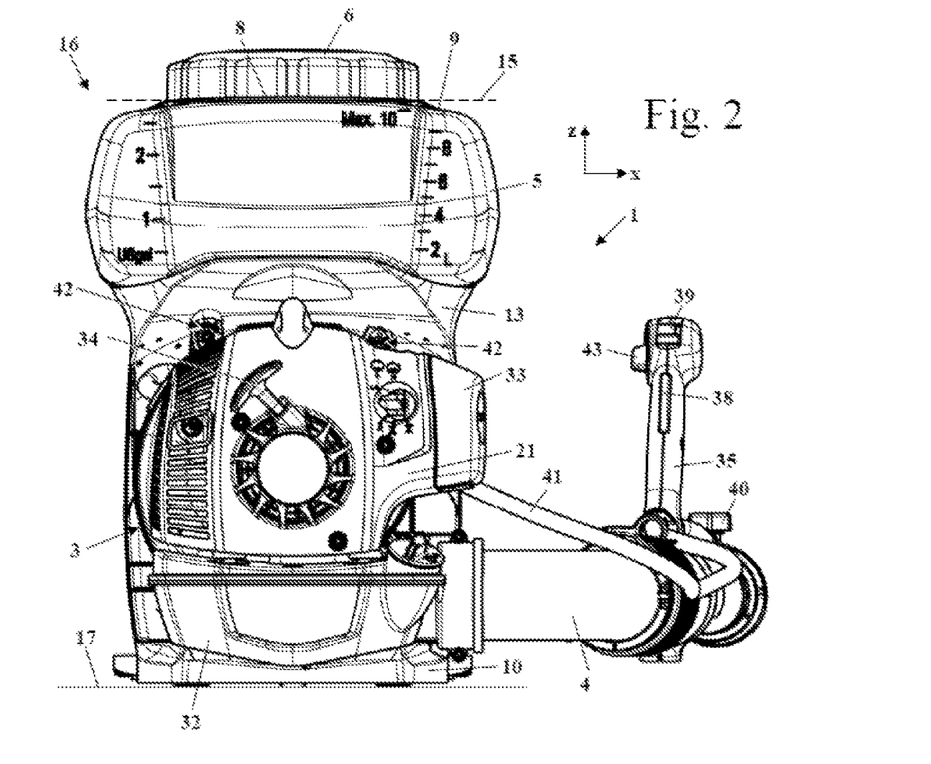
FIG. 2 shows a view of the spraying device from FIG. 1 from the side facing away from the operator.

FIG. 2 shows the spraying device 1 in a standing position 16, in which the spraying device 1 is standing on a horizontal, flat standing face 17. In this case, the base plate 10 stands on the standing face 17. The standing face 17 extends in the spatial directions x and y. The spatial direction z extends upward at right angles to the standing face 17. In the standing position 16, the fuel tank 32 is arranged underneath the blower unit 3 and the spraying medium container 5 is arranged above the blower unit 3. The blower unit 3 is fixed to the back plate 12 of the carrying frame 2 via antivibration elements 42. As FIG. 2 also shows, a starting handle 34 projects out of the housing 21.

The cover 6 has a lower edge 8 located facing the spraying medium container 5 and the blower unit 3. The lower edge 8 lies in a first imaginary plane 15. In the exemplary embodiment, the lower edge 8 of the cover 6 is flat. However, an uneven, for example corrugated or zigzag underside can also be provided. In this case, the imaginary plane 15 is that plane which connects the points of the underside of the cover 6 which project furthest toward the spraying medium container 5 and in the direction of the standing face 17. The lower edge 8 is then not a continuous edge but is formed by individual sections or points of the cover 6. If the cover 6 is placed with its side facing the spraying medium container 5 on a flat, horizontal surface, then the contact points of the cover 6 form with the surface the lower edge 8. The flat, horizontal surface corresponds to the imaginary plane 15.

Figure 3:
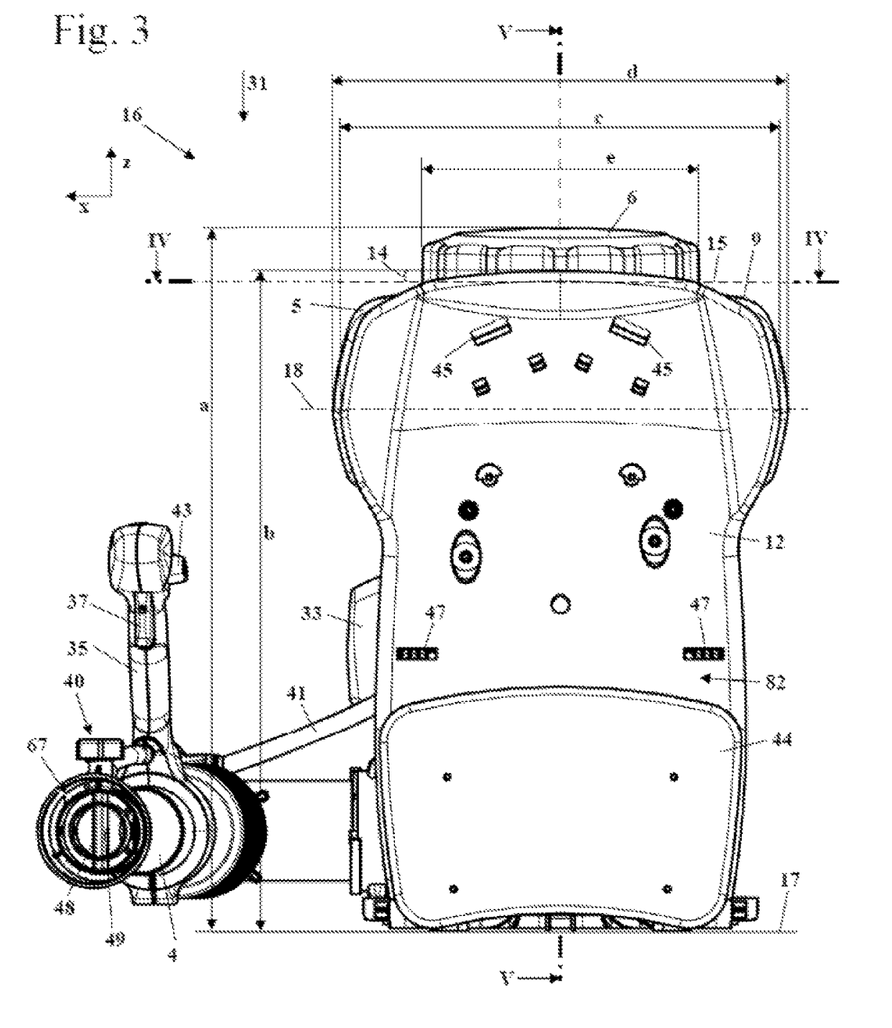
FIG. 3 shows a side view of the spraying device from FIG. 1 from the side facing the operator.

As FIG. 3 shows, in the standing position 16 the back plate 12 extends as far as the height of the lower edge 8 of the cover 6 and projects upward beyond the lower edge 8. In the illustration shown in FIG. 3, the lower edge 8 is completely concealed by the back plate 12. The back plate 12 also largely conceals the spraying medium container 5 in the lateral direction. In the side view of the back plate 12 shown in FIG. 3 from a side 82 facing the operator during operation, only a narrow edge of the spraying medium container 5 is visible. In the viewing direction at right angles to the surface of the back plate 12 from the side 82 of the back plate 12 to be associated with the back of the operator, the spraying medium container 5 is largely concealed by the back plate 12. In this viewing direction, the back plate 12 advantageously conceals at least 80%, in particular at least 90%, of the area of the spraying medium container 5. The back plate 12 has a region 14 which is located higher than the lower edge 8 of the cover 6. In the exemplary embodiment, the width e of the region 14 of the back plate 12 corresponds to the external diameter of the cover 6. Shown in FIG. 3 is an arrow 31, which indicates the vertical direction. The arrow 31 runs parallel to the spatial direction z but in the opposite direction. In the vertical direction, that is to say in the direction of the arrow 31, the region 14 of the back plate 12 is located above the region of the lower edge 8 of the cover 6 which is located facing the carrying frame 2. The imaginary plane 15 is drawn at the height at which the lower edge 8 of the cover 6 is located on the side facing the back plate 12.

As FIG. 3 shows, the back plate 12 has a maximum width c in the spatial direction x. The maximum width c of the back plate 12 is slightly smaller than the maximum width d of the spraying medium container 5. The maximum width d of the spraying medium container 5 is likewise measured in the spatial direction x. The width c of the back plate 12, the width d of the spraying medium container 5 and the width e of the region 14 of the back plate 12 are in each case measured parallel to the standing face 17. The maximum width c of the back plate 12 and the maximum width d of the spraying medium container 5 are measured in the same second imaginary plane 18. The back plate 12 and the spraying medium container 5 have their greatest width c and d, respectively, at the same height. The maximum width c of the back plate 12 is at least about 85% of the maximum width d of the spraying medium container 5. The width c of the back plate 12 in each plane running parallel to the standing face 17 is at least about 80% of the maximum width d of the spraying medium container 5 in the same plane. As a result, the back plate 12 largely conceals the spraying medium container 5. The back plate 12 and the spraying medium container 5 in this region are advantageously formed approximately mirror-symmetrically in relation to the section plane V-V drawn in FIG. 3, that is to say to a plane dividing the spraying medium container 5 centrally.

As FIG. 3 also shows, the spraying device 1 has an overall height a which is somewhat greater than the height b of the carrying frame 2. The overall height a of the spraying device 1 and the height b of the carrying frame 2 are each measured as far as the standing face 17. The height b of the carrying frame 2 is advantageously at least about 80%, in particular at least about 90%, of the overall height a of the spraying device 1. The overall height a of the spraying device 1 and the height b of the carrying frame 2 are measured at right angles to the standing face 17. The direction at right angles to the standing face 17 corresponds to the spatial direction z.

Figure 5:
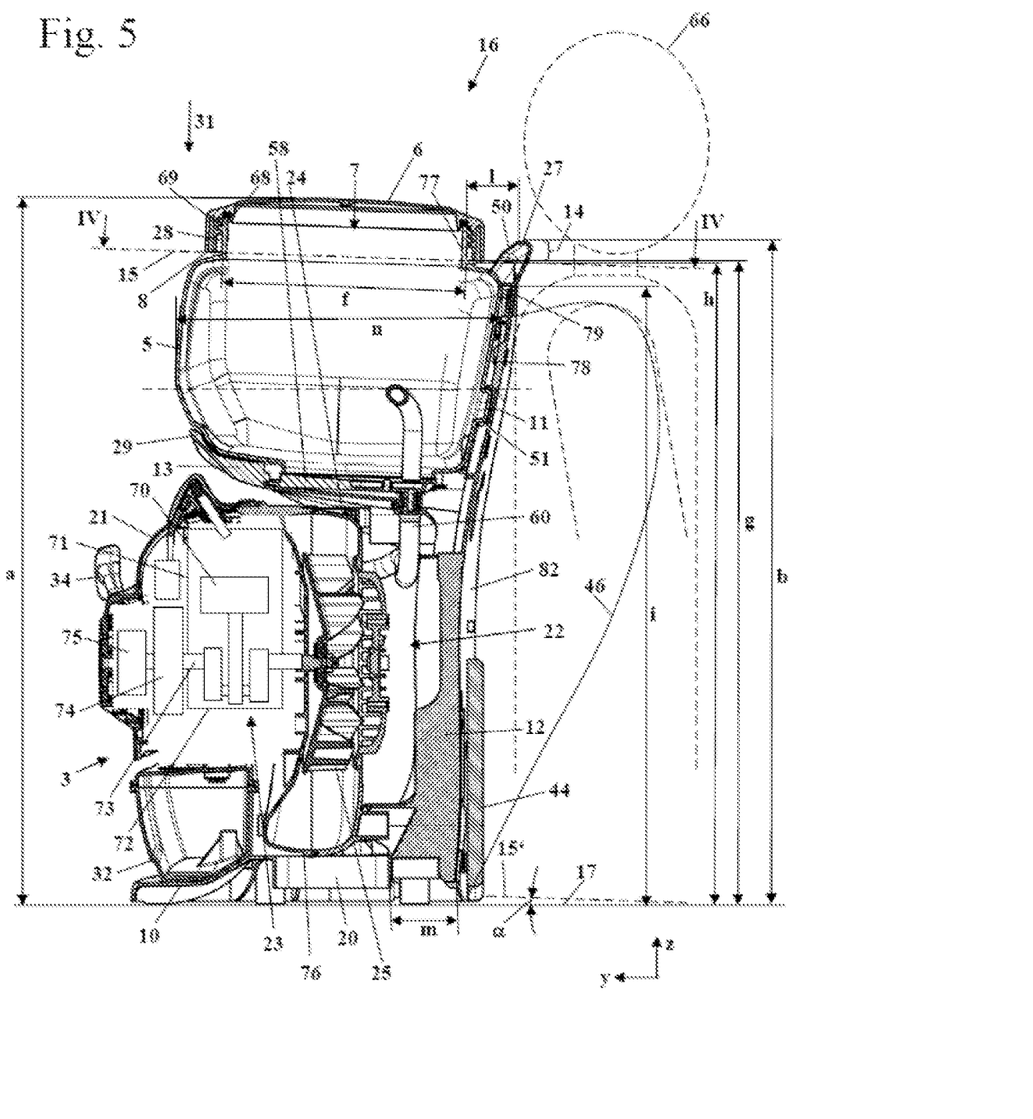
FIG. 5 shows a section along the line V-V in FIG. 3.

As FIG. 3 also shows, the back plate 12 of the carrying frame 2 has two upper passage openings 45 for the fixing of shoulder straps 46, of which one is shown schematically in FIG. 5. The shoulder straps 46 are hooked into the carrying frame 2 with their lower end adjacent to the base plate 10. Two shoulder straps 46 are advantageously provided. In the region facing the standing face 17, the carrying frame 2 has a back cushion 44, with which the carrying frame 2 can be supported on the lower back of an operator.

Figure 4:
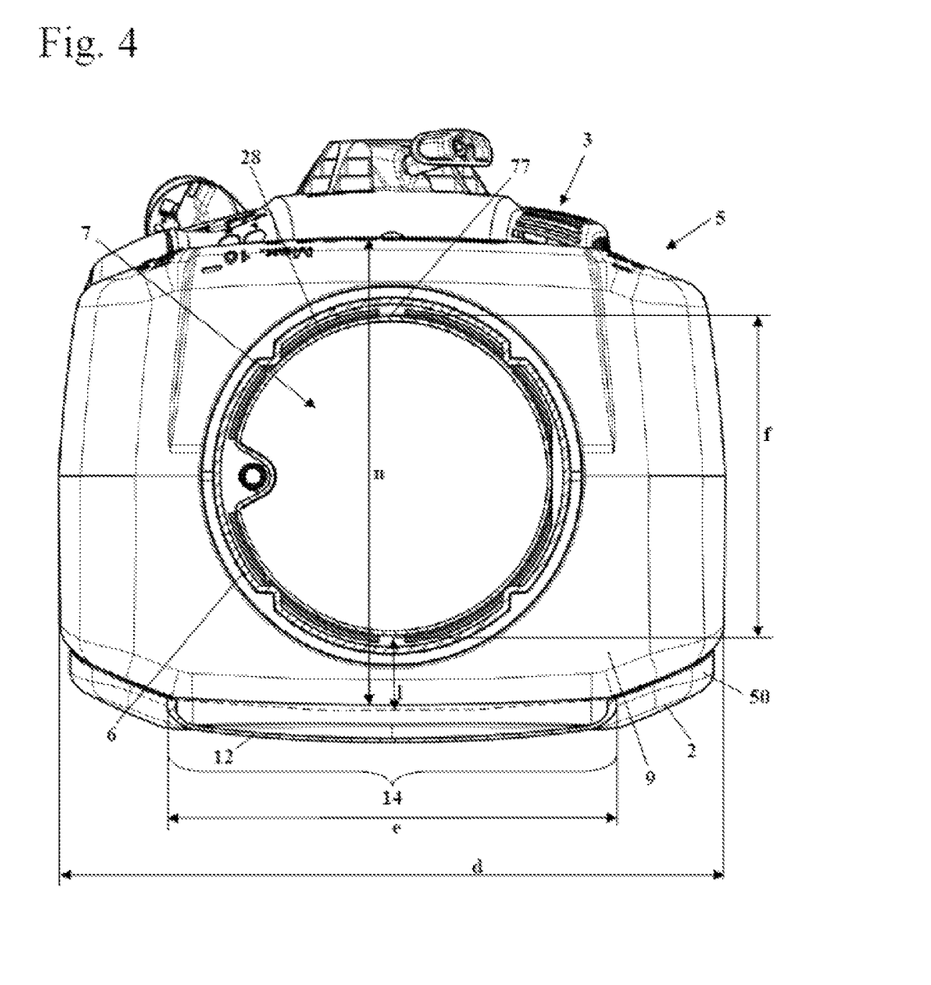
FIG. 4 shows a section along the line IV-IV in FIG. 3 and in FIG. 5.

As FIG. 3 also shows, adjacent to the metering valve 40 in the blower pipe 4 there is arranged a rib 48 which extends transversely through the blower pipe 4 and on which at least one outlet opening 49 for spraying medium is formed. The outlet opening 49 is advantageously arranged approximately centrally in the blower pipe 4, so the result is a good distribution of the spraying medium in the blown air stream. FIG. 4 shows a section through the spraying device 1 at the level of the imaginary plane 15. In the exemplary embodiment, the imaginary plane 15 is not oriented parallel to the standing face 17 but is inclined slightly with respect to the latter. As FIG. 4 shows, the spraying medium container 5 has a filling opening 7, which is closed by the cover 6. The filling opening 7 is formed on a filling nozzle 28, which is formed as a largely cylindrical edge standing upward. The cover 6 is screwed onto the filling nozzle 28. The filling nozzle 28 has an external diameter f. The external diameter f is measured in the first imaginary plane 15. The width e of the region 14 of the back plate 12 in the exemplary embodiment is somewhat greater than the external diameter f of the filling nozzle 28. The width e of the region 14 of the back plate 12 is advantageously at least about 80% of the external diameter f of the filling nozzle 28, both the width e and the external diameter f being measured in the imaginary plane 15. Advantageously, the width e of the region 14 of the back plate 12 is at least as great as the external diameter f of the filling nozzle 28, in particular greater than the external diameter f of the filling nozzle 28. In the exemplary embodiment, the width e of the region 14 of the back plate 12 is approximately 1.4 times the external diameter f of the filling nozzle 28. As FIG. 4 also shows, adjacent to the spraying medium container 5 the back plate 12 has an edge 50 which is bent over in the direction of the spraying medium container 5. The result is a largely closed, rounded external contour of the spraying device 1 at the transition of the back plate 12 to the spraying medium container 5. The bent-over edge 50 largely shields the spraying medium container 5 with respect to the operator and thus largely avoids the operator being able to come into contact with the spraying medium container 5 and with spraying medium that has run down on the spraying medium container 5 when he carries the spraying device 1 on his back by using the shoulder straps of the carrying frame 2.

The filling nozzle 28 is at a distance l from the back plate 12 of the carrying frame 2 which, in FIG. 4, is drawn schematically in the first imaginary plane 15. The distance l is actually measured parallel to the standing face 17, as shown in FIG. 5, and not in the imaginary plane 15. The distance l is smaller than the half of the external diameter f of the filling nozzle 28. The distance l is advantageously less than about 30% of the external diameter f of the filling nozzle 28. The distance l of the filling nozzle 28 from the carrying frame 2 is advantageously less than about 8 cm, in particular less than about 6 cm. A distance l of about 3 cm to about 6 cm has proven to be particularly advantageous. The distance l is advantageously less than about 30%, in particular less than about 20%, of the width d of the spraying medium container 5. The distance l is advantageously less than 30%, in particular less than about 25%, of the depth n of the spraying medium container 5. The distance l is measured to the filling nozzle 28 and not to the external thread 68 arranged on the filling nozzle 28. In the exemplary embodiment, the distance l is measured to the upper edge 50 of the back plate 12. The distance l should be measured to the region of the back plate 12 which is at the shortest distance from the filling nozzle 28. The depth n of the spraying medium container 5 is advantageously smaller than the width d of the spraying medium container 5. The depth n is advantageously less than about 90%, in particular less than about 80%, of the width d. The result is a compact structure, and the center of gravity of the spraying medium container can be arranged close to the back plate 12 of the carrying frame 2. The spraying medium container 5 advantageously rests on the back plate 12, as FIG. 4 shows. The external diameter f of the filling nozzle 28 is advantageously comparatively large, in order to permit easy filling with spraying medium. The external diameter f is advantageously more than half the depth n of the spraying medium container 5. The external diameter f is advantageously also more than half the width d of the spraying medium container. The depth n and the distance l are measured parallel to the standing face 17, as shown in FIG. 5.

As the sectional illustration of FIG. 5 shows, the lower edge 8 of the cover 6 is at a minimum distance g from the standing face 17 in the standing position 16. The minimum distance g between the lower edge 8 of the cover 6 and the standing face 17 in the exemplary embodiment exists on the side of the cover 6 facing the back plate 12. The filling nozzle 28 has on its external circumference an external thread 68, in which an internal thread 69 of the cover 6 engages. The external diameter f of the filling nozzle 28 is measured underneath the external thread 68 when in the standing position 16. The external diameter f of the filling nozzle 28 is advantageously measured adjacent to an edge 77 at which the filling nozzle 28 merges into the upper side 9 of the spraying medium container 5. The edge 77 extends largely circularly, as FIG. 4 also shows. In the standing position 16, the edge 77 is at a distance h from the standing face 17 which is slightly smaller than the distance g of the lower edge 8 of the cover 6 from the standing face 17. The distance h of the edge 77 from the standing face 17 is smaller than the height b of the carrying frame 2. As a result, the edge 77 is also shielded with respect to the operator 66 by the back plate 12 of the carrying frame 2.

As FIG. 5 also shows, the cover 6 closes the filling opening 7. The back plate 12 has an upper edge 27 which designates the edge which is at the greatest distance from the standing face 17. The upper edge 27 is at a distance from the standing face 17 which corresponds to the height b of the carrying frame 2. As FIG. 5 shows, the edge 50 is also bent over in the region of the upper edge 27 toward the spraying medium container 5 and toward the cover 6 of the spraying medium container 5.

The spraying medium container 5 has a region 78 in which the wall of the spraying medium container 5 extends approximately parallel to the carrying frame 2. In the exemplary embodiment, the spraying medium container 5 rests on transverse struts 52 of the carrying frame 2, shown in FIG. 8. However, provision can also be made for the spraying medium container 5 to be at a distance from the back plate 12 of the carrying frame 2. The spraying medium container 5 is advantageously arranged close to the back plate 12, in order to achieve a beneficial weight distribution. In the region 78, the wall of the spraying medium container 5 falls sharply. The wall is approximately flat and oriented approximately vertically or slightly inclined with respect to the vertical. The steeply falling region 78 has an upper section 79. In the upper section 79, the steeply falling region 78 merges into a rounded portion and, adjacent thereto, into the upper side 9. In the sectional plane shown in FIG. 5, in which the carrying frame 2 is sectioned approximately centrally parallel to the spatial direction z, the upper section 79 is at a distance i from the standing face 17 which is smaller than the height b of the carrying frame. The lower edge 8 of the cover 6, the edge 77 of the spraying medium container and the upper section 79 of the steeply falling region 78 of the spraying medium container 5 are accordingly located deeper in the standing position 16 and closer to the standing face than the upper edge 27 of the carrying frame 2.

FIG. 5 also shows the arrangement of the spraying medium container 5 on the carrier part 13. The spraying medium container 5 lies on the carrier part 13. The carrier part 13 is hooked into the back plate 12 of the carrying frame 2. The spraying medium container 5 has a connecting flange 58, on which connections, also shown in FIG. 6, for a pressure relief line 59 into the spraying medium container 5, an intake line 61 and a return line 60 to a spraying medium pump, not shown, are provided. The connecting flange 58 is arranged in a receptacle 62, shown in FIG. 6, belonging to the carrier part 13. The carrier part 13 has, on the side facing away from the back plate 12, an edge 29 which points upward and engages around the spraying medium container 5 in the region of the latter facing the blower unit 3 and facing away from an operator 66. As FIG. 5 also shows, a web 11, which projects into a receptacle 51 on the back plate 12 and, as a result, additionally fixes the spraying medium container 5 in its position, is integrally molded on the spraying medium container 5.

In FIG. 5, the operator 66 is drawn in schematically. The upper edge 27 is located adjacent to the head and the nape of the neck of the operator 66 during operation, that is to say when the operator 66 is carrying the spraying device 1 with the shoulder straps 46 on his shoulders. As a result of the fact that the back plate 12 projects as far as a height above the lower edge 8 of the cover 6 of the spraying medium container 5, the back plate 12 prevents the head of the operator 66 being able to come into contact with the spraying medium container 5, even if the operator 66 bends his head toward the nape of his neck.

As FIG. 5 shows, an interspace 22 is formed between the housing 21 of the blower unit 3 and the back plate 12 of the carrying frame 2. Spraying medium which is intercepted by the carrier part 13 and the back plate 12 passes toward the base plate 10 via the interspace 22. The base plate 10 has a drainage opening 20, via which the spraying medium intercepted is led downward. The drainage opening 20 is at a distance m, measured parallel to the standing face 17, with respect to the side 82 of the back plate 12 that faces the operator 66. The distance m is not measured to a back cushion 44 fixed to the back plate 12 but to the back plate 12 itself. The distance m is advantageously at least about 3 cm. The distance m is particularly advantageously about 4.5 cm to about 6 cm. In the exemplary embodiment, a distance m of about 5 cm to about 5.5 cm is provided.

In FIG. 5, the drive motor 23 is also shown schematically. The drive motor 23 is constructed as an internal combustion engine and has a piston 70 which is mounted so as to move to and fro in a cylinder 71 and drives a crankshaft 73 rotatably mounted in a crankcase 72. A flywheel 74 is arranged on the crankshaft 73. In addition, the starting device 75, to be actuated via the starting handle 34, acts on the crankshaft 73. On the side facing away from the starting device 75, an impeller 25 which delivers the working air stream into a blower spiral 76 and from there into the blower pipe 4 is fixed to the crankshaft 73. The housing 21 has a housing wall 24 which is able to delimit the blower spiral 76, at least to some extent, and which can extend at least partly in the region underneath the connecting flange 58. In the standing position 16, the housing wall 24 falls toward the interspace 22.

As FIG. 5 also shows, the first imaginary plane 15 is inclined with respect to the standing face 17. The first imaginary plane 15 in the exemplary embodiment falls toward the back plate 12 of the carrying frame 2. In FIG. 5, the angle α between the first imaginary plane 15 and the standing face 17 is drawn in schematically, the angle α being drawn in between a parallel 15' to the first imaginary plane 15 for the purpose of better illustration. The angle α is advantageously less than 10°. In the standing position 16, the first imaginary plane 15 accordingly extends approximately horizontally. The angle α is preferably less than 5°, in particular about 2°. The angle α is preferably chosen such that the first imaginary plane 15 extends horizontally when the spraying medium container 5 is completely filled, on account of the elastic deformation of the carrier part 13 by the weight of the spraying medium.

Figure 6:
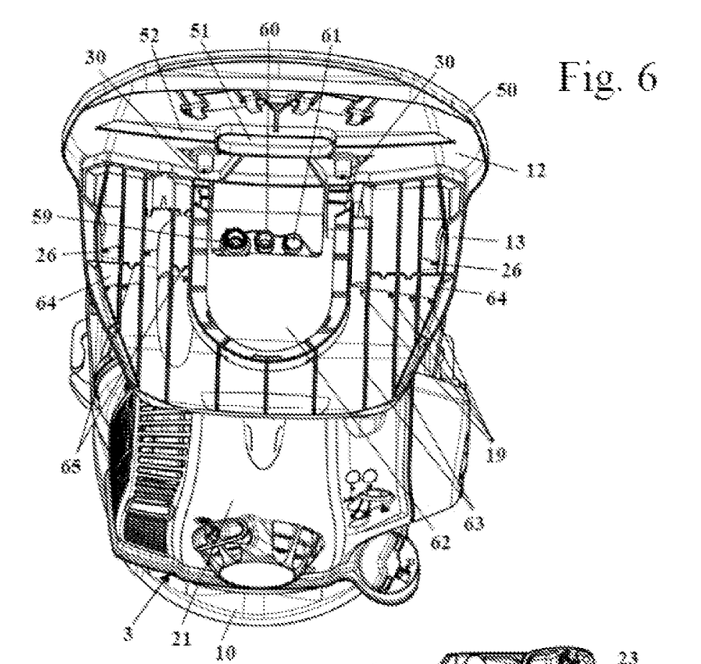
FIG. 6 shows a perspective illustration of the spraying device with spraying medium tank removed and blower pipe removed.
Figure 7:
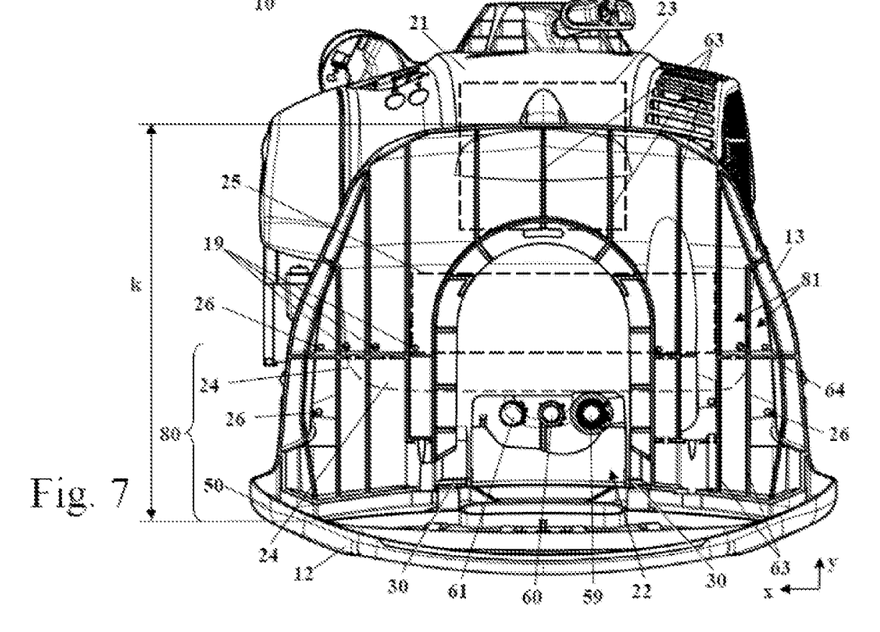
FIG. 7 shows a plan view of the spraying device from FIG. 6.

As FIGS. 6 and 7 show, the carrier part 13 has drainage openings 19, which open toward the blower unit 3 in the region above the housing wall 24. Spraying medium which runs toward the blower unit 3 via these drainage openings 19 can drip onto the housing wall 24 and run along on the housing wall 24 down into the interspace 22. As a result of the fact that the housing wall 24 falls toward the interspace 22 and rises in the direction of the drive motor 23, the spraying medium cannot reach the drive motor 23 and cause corrosion there. The carrier part 13 has further drainage openings 26, which open immediately above the interspace 22 and lead the spraying medium directly into the interspace 22. As FIGS. 6 and 7 additionally show, two drainage openings 30 are formed between the carrier part 13 and the back plate 12. The drainage openings 30 are delimited by the carrier part 13 and the back plate 12. In the exemplary embodiment, the drainage openings 30 are arranged adjacent to the receptacle 62. It is possible for any desired numbers of drainage openings 19, 26 and 30 to be provided in the different regions. FIG. 7 shows the position of the drive motor 23 and the impeller 25 under the carrier part 13 in schematic form, so that the position of the drainage openings 19, 26 and 30 in relation to the drive motor 23 and the housing 21 having the housing wall 24 can be seen. The drainage openings 19, 26 and 30 are arranged such that spraying medium cannot pass in the direction of the drive motor 23 or of operating elements of the drive motor 23, such as the starting handle 34 or operating elements, not shown, for choke and/or purger, and wet these.

The carrier part 13 has a depth k which is measured approximately at right angles to the back plate 12 in the spatial direction y. The carrier part 13 has drainage openings 19, 26, 30, which are located facing the back plate 12 only in the region 80 of the carrier part 13. In relation to the spatial direction y, the region 80 designates that half of the carrier part 13 which is located adjacent to the back plate 12. Each drainage opening 19, 26, 30 is at a distance from the back plate 12 which is less than half the depth k of the carrier part 13. The drainage openings 19 and 26 are each arranged in a chamber 81 delimited laterally by longitudinal webs 63 and transverse webs 64 and by the edge of the carrier part 13. The drainage openings 19 and 26 are each arranged in the region of each chamber 81 that is arranged lowest in the standing position 16. This ensures that no spraying medium can collect in the carrier part 13; instead, the spraying medium drains substantially completely. The chambers 81 are open at the top in the spatial direction z, i.e. in the standing position 16, and are covered by the spraying medium container 5, not shown in FIG. 7.

FIGS. 6 and 7 additionally show the pressure relief line 59, the return line 60 and the intake line 61, each in the region of their connection to the spraying medium container 5.

As FIGS. 6 and 7 show, the back plate 12 has a transverse strut 52 adjacent to the receptacle 51. The carrier part 13 has a multiplicity of longitudinal webs 63 and transverse webs 64. The longitudinal webs 63 and transverse webs 64 increase the stability of the carrier part 13. As FIG. 6 shows, the transverse webs 64 to some extent have depressions 65, so that spraying medium can run along on the spraying medium container 5 over the transverse webs 64.

Figure 8:
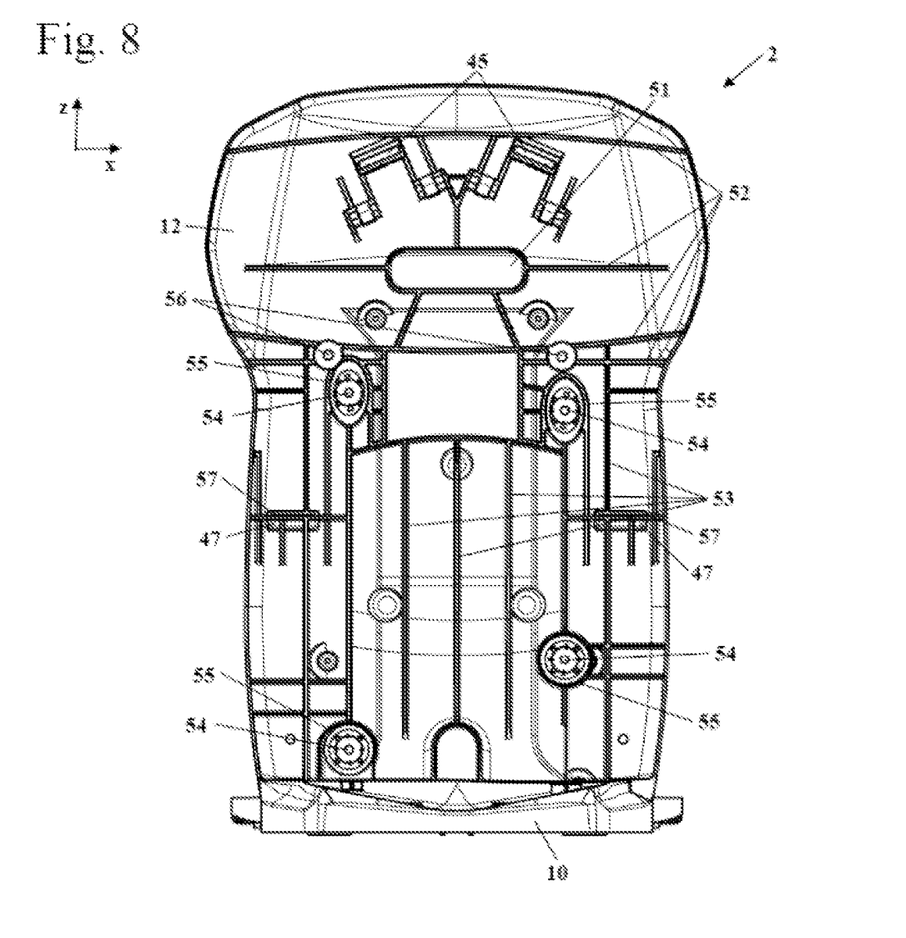
FIG. 8 shows a side view of the carrying frame from the side facing away from the operator.

As FIG. 8 shows, the carrying frame 2 has further transverse struts 52 and a multiplicity of longitudinal struts 53. The transverse struts 52 and the longitudinal struts 53 increase the stability of the carrying frame 2. The spraying medium can flow away over the transverse struts 52. The spraying medium can also drip downward off the transverse struts 52. Since the side of the carrying frame 2 facing the spraying medium container 5 and the blower unit 3 cannot come into contact with the operator, no specific drainage of the spraying medium is needed.

The carrying frame 2 has a total of four fixing openings 54 for antivibration elements 42 (FIG. 2). The fixing openings 54 are each arranged in a receptacle 55 for the antivibration element 42. In addition, two fixing openings 56 for the carrier part 13 are formed on the carrying frame 2. The carrier part 13 is advantageously placed on supporting tongues 57 and fixed to the back plate 12 in the horizontal direction by fixing screws which project through the fixing openings 56. For the purpose of pre-assembly of the carrier part 13, adjacent to the supports 57 the carrying frame 2 has mounting openings 47, which are also shown in FIG. 3.

The foregoing description of preferred embodiments of the application has been presented for purposes of illustration and description only. It is not intended to be exhaustive or to limit the application to the precise form disclosed, and modifications and variations are possible and/or would be apparent in light of the above teachings or may be acquired from practice of the application. The embodiments were chosen and described in order to explain the principles of the application and its practical application to enable one skilled in the art to utilize the application in various embodiments and with various modifications as are suited to the particular use contemplated. It is intended that the scope of the application be defined by the claims appended hereto and that the claims encompass all embodiments of the application, including the disclosed embodiments and their equivalents.

The invention claimed is:

1. A backpack spraying device comprising:
a carrying frame comprising a backplate,
a blower unit,
a spraying medium container for containing a spraying medium,
wherein the blower unit and spraying medium container are fixed to the carrying frame,
wherein the blower unit conveys an air stream through a blower pipe connected to the blower unit,
wherein the spraying medium container further comprises a filling opening which is closed by a cover,
wherein the spraying medium is conveyed from the spraying medium container through a spraying medium line to the air stream,
wherein the cover comprises a lower edge facing the spraying medium container,
wherein the backpack spraying device comprises a standing position in which the spraying device stands on a flat, horizontal standing face,
wherein the cover is arranged on an upper side of the spraying medium container facing away from the standing face,
wherein the spraying medium container is arranged above the blower unit when in a standing position,
wherein the height of the carrying frame, measured at right angles to the standing face, is at least about 80% of the overall height of the spraying device, measured at right angles to the standing face,
wherein a region of the back plate is arranged above the lower edge of the cover when in the standing position.

2. The backpack spraying device according to claim 1, wherein the filling opening is formed on a filling nozzle.

3. The backpack spraying device according to claim 2, wherein the filling nozzle merges at one edge into an upper side of the spraying medium container,
wherein the distance from the edge to the standing face, measured at right angles to the standing face and adjacent to the carrying frame, is less than the height of the carrying frame.

4. The backpack spraying device according to claim 2, wherein, in the standing position, at least one region of the carrying frame is located higher than at least one region of the lower edge of the cover.

5. The backpack spraying device according to claim 4, wherein a width of the region of the carrying frame, measured parallel to the standing face, is at least about 80% of the external diameter of the filling nozzle.

6. The backpack spraying device according to claim 4, wherein the lower edge of the cover lies in a first imaginary plane,
wherein the angle between the first imaginary plane and the standing face is less than about 10°.

7. The backpack spraying device according to claim 2, wherein the distance between the filling nozzle and the carrying frame, measured parallel to the standing face, is less than half the external diameter of the filling nozzle.

8. The backpack spraying device according to claim 1, wherein the maximum width of the carrying frame is at least about 85% of the width of the spraying medium container.

9. The backpack spraying device according to claim 1, wherein the width of the carrying frame in each plane running parallel to the standing face is at least about 80% of the width of the spraying medium container in the same plane.

10. The backpack spraying device according to claim 1, wherein the carrying frame further comprises a base plate.

11. The backpack spraying device according to claim 10, wherein, at an upper edge of the carrying frame located facing away from the base plate, the carrying frame is bent over toward the spraying medium container.

12. The backpack spraying device according to claim 10, wherein the base plate further comprises at least one drainage opening.

13. The backpack spraying device according to claim 12, wherein the distance between the drainage opening and the side of the back plate that faces an operator, measured parallel to the standing face, is at least about 3 cm.

14. The backpack spraying device according to claim 10, wherein the spraying medium container is joined to the carrying frame by a carrier part.

15. The backpack spraying device according to claim 14, wherein the carrier part comprises at least one drainage opening.

16. The backpack spraying device according to claim 15, wherein the blower unit comprises a drive motor and an impeller driven by the drive motor,
which are arranged in a housing,
wherein an interspace is formed between the blower unit and the back plate.

17. The backpack spraying device according to claim 16, wherein, in the standing position, the at least one drainage opening is arranged above a housing wall of the housing which falls toward the interspace.

18. The backpack spraying device according to claim 16, wherein, in the standing position, the at least one drainage opening is arranged above the interspace.

19. The backpack spraying device according to claim 14, wherein at least one drainage opening is formed between the carrier part and the back plate.

20. The backpack spraying device according to claim 1, wherein the back plate is arranged to prevent a spilled spraying medium from coming into contact with the operator during operation of the backpack spraying device.

* * * * *